United States Patent [19]

Sunohara et al.

[11] 4,381,050

[45] Apr. 26, 1983

[54] VACUUM MODULATOR ARRANGEMENT FOR AN AUTOMATIC TRANSMISSION

[75] Inventors: Yoshio Sunohara; Kunio Ohtsuka, both of Yokohama; Kenichi Sakamoto, Fujisawa, all of Japan

[73] Assignee: Nissan Motor Co., Ltd., Yokohama, Japan

[21] Appl. No.: 195,207

[22] Filed: Oct. 7, 1980

[30] Foreign Application Priority Data

Oct. 8, 1979 [JP] Japan .................................. 54-128954

[51] Int. Cl.³ ....................... B60K 41/20; B60K 41/04
[52] U.S. Cl. ........................................ 192/1; 192/4 A; 74/865; 137/625.2
[58] Field of Search ........................... 192/4 A, 1, 3 S; 74/865, 861, 863, 695; 137/625.2, 625.22

[56] References Cited

U.S. PATENT DOCUMENTS

| | | | |
|---|---|---|---|
| 3,171,436 | 3/1965 | Lowell | 137/625.22 X |
| 3,436,989 | 4/1969 | Krieg et al. | 74/865 X |
| 3,738,197 | 6/1973 | Brumm et al. | 74/861 X |
| 3,757,913 | 9/1973 | Passon | 74/865 X |
| 3,765,273 | 10/1973 | Re | 74/865 |
| 3,827,315 | 8/1974 | Lupo | 74/863 |
| 3,882,739 | 5/1975 | Eltze | 74/863 X |
| 4,168,638 | 9/1979 | Usui | 74/863 |
| 4,223,570 | 9/1980 | Yamamori et al. | 74/695 |

FOREIGN PATENT DOCUMENTS

| | | |
|---|---|---|
| 2112804 | 9/1972 | Fed. Rep. of Germany . |
| 2301005 | 7/1974 | Fed. Rep. of Germany . |
| 1555229 | 8/1974 | Fed. Rep. of Germany . |
| 744747 | of 0000 | United Kingdom . |
| 855123 | of 0000 | United Kingdom . |
| 1181357 | of 0000 | United Kingdom . |
| 1223158 | of 0000 | United Kingdom . |
| 1517739 | 12/1973 | United Kingdom . |

Primary Examiner—George H. Krizmanich
Attorney, Agent, or Firm—Thompson, Birch, Gauthier & Samuels

[57] ABSTRACT

A vacuum modulator arrangement for an automatic transmission of a motor vehicle for use in conjunction with a diesel engine or other fuel-injection engine, includes a vacuum source, a brake booster, a vacuum modulator, a throttle modulator for controlling the automatic transmission, connecting means connected to the vacuum source, the brake booster, the vacuum modulator and the throttle modulator, the connecting means including a passage commonly leading to the vacuum modulator and the throttle modulator, and an orifice placed in the common passage, the orifice having a predetermined effective area.

7 Claims, 24 Drawing Figures

VACUUM MODULATOR ARRANGEMENT FOR AN AUTOMATIC TRANSMISSION

BACKGROUND OF THE INVENTION

This invention relates to a vacuum-control modulator arrangement for an automatic transmission of a motor vehicle, primarily for use in conjunction with a diesel or other fuel-injection engine.

An automatic transmission of the motor vehicle must bring the gearshift operations into harmony with the torque thereto, i.e., the torque of the engine, regardless of the types of engines. Otherwise, the correct gear-change actions could not take place at the correct moment, which could result in an increase of the shock associated with gear-change actions. Thus, the gearshift operations may be worsened to the point of driving discomfort.

In carburetor type engines, as the vacuum at the induction manifold is substantially proportionate to the engine torque, the control oil pressure (throttle pressure) corresponding to the induction manifold vacuum is usually produced to control the gearshift operations thereby.

However, in fuel injection type engines such as diesel engines, because the induction manifold vacuum is not proportionate to the engine torque, it cannot be used as a source of transmission control.

Figure 1:
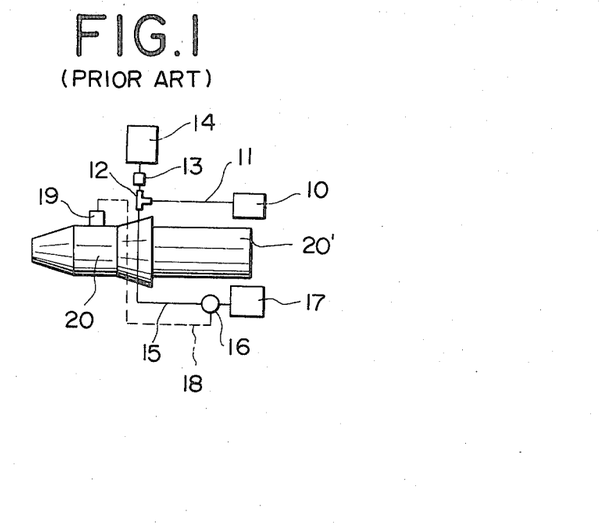
FIG. 1 is a diagrammatic view showing a prior art vacuum modulator arrangement for an automatic transmission.

FIG. 1 shows a prior art vacuum modulator arrangement for an automatic transmission which is disclosed in U.S. Pat. No. 3,738,197 to K. Brumm et al. A vacuum pump 10 is connected via a line 11 at a branch portion 12 to two parts: a brake power booster 14 of a diesel-driven motor vehicle through a non-return valve 13; and a vacuum modulator 16 through a line 15 which modulator 16 is positioned near a fuel-injection pump 17 at the opposite side of an engine 20'. By actuating the vacuum modulator 16 in response to the fuel-injection pump 17, the vacuum from the vacuum pump 10 is controlled and transmitted via the line 18 to the throttle modulator 19 where the throttle oil modulating operations for the gearshift actions of the automatic transmission take place in a well known manner.

The vacuum modulator 16 is designed so that the effective areas of communication between the lines 15 and 18 and between the line 18 and the opening (not shown) to the atmosphere can be controlled to produce a proper vacuum into the line 18. Thus, in the prior art arrangement, the line 15 between the branch portion 12 and the vacuum modulator 16 must be long. Also, the line 18 between the throttle modulator 19 and the vacuum modulator 16 must be long. In practice, such lines are complicated. As a result, the production costs thereof are high. As the vacuum modulator 16 is to simultaneously change or control the effective areas between the two pair of lines, only one throttle characteristic of the vacuum modulator can be obtained. When the accelerator is completely closed, the output vacuum is the same as the pressure of the vacuum source, and when it is completely open, it is the same as the atmospheric pressure.

A thin slit is used as a throttle means. For such a reason, some structural defects such as dust clogging or the like cannot be avoided.

SUMMARY OF THE INVENTION

It is an object of the present invention to provide a vacuum modulator arrangement for an automatic transmission which is simple in construction.

A further object of the present invention is to provide a vacuum modulator arrangement for an automatic transmission in which the throttle characteristics thereof can be changed corresponding to a necessary vacuum.

Still a further object of the present invention is to provide a vacuum modulator arrangement for an automatic transmission in which particularly a vacuum modulator is improved to prevent dust or the like from clogging therein.

Another object of the present invention is to provide an arrangement for vacuum control of a modulator in automatic transmissions of motor vehicles powered by diesel engines or other fuel-injection engines in which a vacuum modulator can produce a vacuum corresponding to the accelerator pedal degree.

According to the present invention, a vacuum-control modulator arrangement for an automatic transmission of a motor vehicle includes a vacuum modulator which can change the vacuum such as the vacuum source in a vacuum pump to correspond to the accelerator pedal opening degree, which vacuum corresponding to the induction manifold vacuum in carburetor type engines can be used as a control signal for the automatic transmission, so that the correct gear-change actions can take place at the correct moment as in carburetor type engines.

BRIEF DESCRIPTION OF THE DRAWINGS

FIGS. 4(A) through 11(B) show the vacuum modulator arrangements according to the present invention in which a spindle is rotatable;

FIGS. 12(A) through 13(B) show the vacuum modulator arrangements according to the present invention in which a spindle is slidable in its longitudinal direction.

DETAILED DESCRIPTION OF THE PREFERRED EMBODIMENTS

Figure 2:
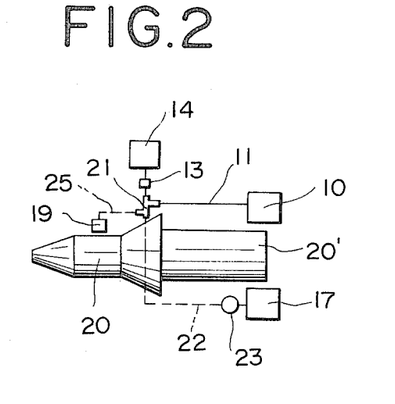
FIG. 2 is a diagrammatic view showing a vacuum modulator arrangement for an automatic transmission according to the present invention.

FIG. 2 shows diagrammatically a vacuum modulator arrangement for an automatic transmission of a motor vehicle according to a preferred embodiment of the present invention. A vacuum pump 10 is used as a vacuum source. The vacuum pump 10 is connected via a line 11 to a branch portion 21. The construction of the branch portion 21 differs from the branch portion 12 shown in FIG. 1 as a prior art arrangement. The branch portion 21 is separately connected via a non-return or check valve 13 to a booster 14, via a line 22 to a vacuum modulator 23, and via the line 25 to a throttle modulator 19.

Figure 3:
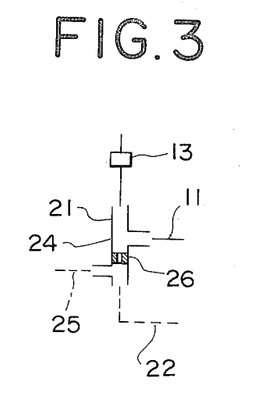
FIG. 3 is a diagrammatic view showing a branch portion of the vacuum modulator arrangement shown in FIG. 2.

FIG. 3 shows by way of example, an interior structure of the branch portion 21 shown in FIG. 2. An orifice 26 is provided in a branch passage 24 communicating with the line 22 leading to the vacuum modulator 23 and the line 25 leading to the throttle modulator 19. The line 11 communicates with the common branch passage 24 and another passage 21 leading through the check valve 13 to the booster 14. It is preferable that the orifice 26 be fixedly secured in the common passage 24. For example, in view of a type of motor vehicle, a proper orifice is chosen to obtain the best oil pressure characteristics. If the effective diameter of the orifice 26 is d and the performance of the vacuum source (the vacuum pump 10) is V (cc/rev.), then the following equation can be used to obtain the best oil pressure characteristics:

$$V/d = 15 \text{ to } 90 \text{ (cc/rev.}\phi\text{ mm)}$$

In the case when the vacuum pump 10 is positioned at one side of the engine 20' and the fuel-injection pump 17 and the vacuum modulator 23 are positioned at the other side, the vacuum pump 10, the line 11, the connector or branch portion 21, the line 25 and the throttle modulator 19 positioned at one side of the engine are connected via the line 22 to the vacuum modulator 23 positioned at the other side of the engine. Thus, the construction of the vacuum modulator arrangement can be simplified. Also, only by changing the orifice 26 near the branch portion 21 without any change of the vacuum modulator 23 itself, maximum intake air flow from the vacuum modulator 23 can be changed to control the maximum vacuum thereby to change the characteristics of the throttle pressure obtained by the throttle modulator 19.

During operation, the vacuum pump 10 supplies a vacuum to the branch portion 21 via line 11. This vacuum is connected to the brake power booster 14 through a check valve 13 essentially as shown in the prior art. An orifice 26 in line 24 separates lines 25 and 22 from the vacuum source 10 and brake power booster 14 as shown in FIGS. 2 and 3. This allows for enhanced control of the application of the vacuum to the throttle modulator 19 by the vacuum modulator 23. The vacuum modulator 23 is controlled or regulated by the fuel-injection pump 17 as will be described hereinafter. Accordingly, changes in the operation of the fuel-injection pump actuate the vacuum modulator 23 to change the vacuum applied to the throttle modulator 19. In this manner, the orifice 26 allows the vacuum modulator 23 to control the vacuum applied to the throttle modulator 19 via branch 21 without having to directly connect the throttle modulator 19 to the vacuum modulator 23.

Figure 4A:
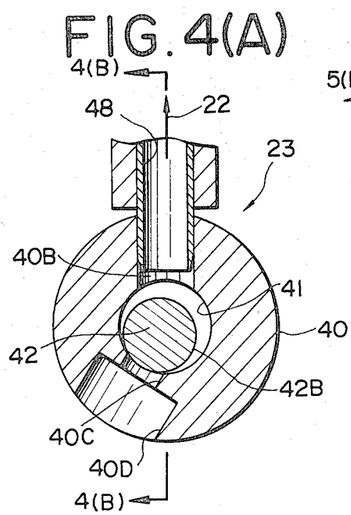
Figures 4B, 5B:
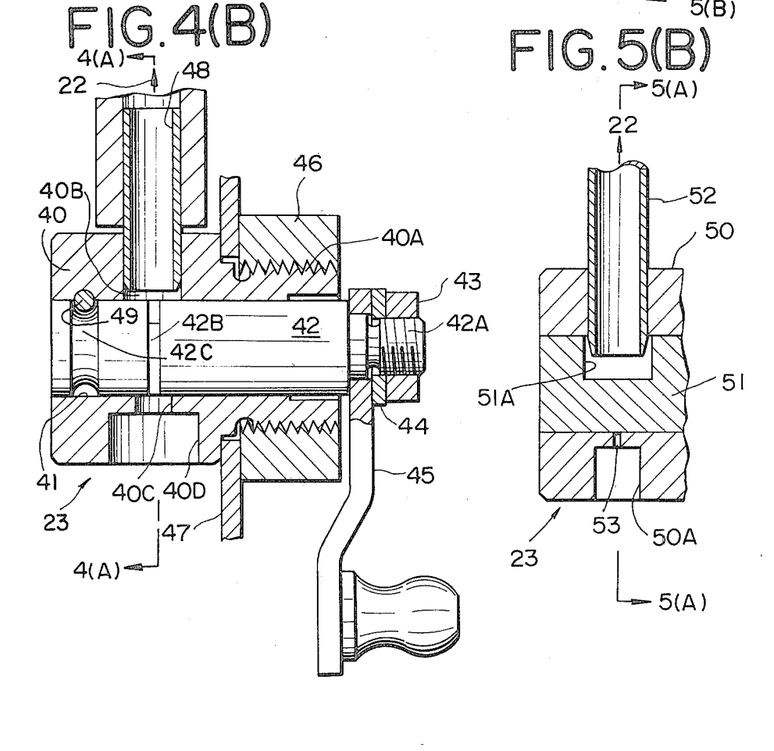

FIGS. 4A and 4B show a vacuum modulator 23 for use in conjunction with the vacuum modulator arrangement shown in FIG. 2. A casing 40 has a through-hole 41 formed in its axial direction wherein a spindle 42 is rotatably placed. The right end of the spindle 42 is formed with a male screw portion 42A on which a nut 43 is set through a washer 44. A lever 45 is fixed at its base end to the right end of the spindle 42 by means of the male screw portion 42A and the nut 43. For example, the lever 45 may be so designed to be actuated in response to the operation of the injection pump 17. Also, the right end of the casing 40 is formed with a male screw portion 40A on which a nut 46 is set whereby the casing 40 is fixedly secured to a bracket 47.

An eccentric groove 42B is formed in an intermediate portion of the spindle 42. As shown in FIG. 4A, a crescent-shaped space is formed between the eccentric groove 42B and the inner surface of the through-hole 41. The upper portion of the casing 40 corresponding to the crescent-shaped space is formed with a radial through-hole 40B. A pipe 48 is fixed in the through hole 40B. The upper end of the pipe 48 is connected to the line 22 for the vacuum. On the other hand, a port 40C is formed at a lower portion of the casing 40 slightly with an angle to the axis of the pipe 48. The size of the port 40C is so selected that the lower portion of the spindle 42 can completely close the upper end of the port 40C. The port 40C is connected to the atmosphere via a notched portion 40D or the like.

As shown in FIG. 4B, a circular groove 42C is formed near the left end of the spindle 42. A pin 49 fixed onto the inner surface of the through hole 41 near its left end is placed in the circular groove 42C partly to prevent the spindle from moving in the longitudinal direction thereof within the casing 40.

In operation, the eccentric groove 42B and the port 40C function as a valve so that the change of the angular position of the spindle 42 to the casing 40 can control the vacuum pressure. That is, when the lever 45 is actuated to rotate, the position of the eccentric groove 42B of the spindle 42 moves thereby to change the effective area between the port 40C and the eccentric groove 42B. In such a case, the valve opening is determined depending on the sectional area of the eccentric groove 42B.

With this construction of the vacuum modulator arrangement, where the eccentric groove 42B and the port 40C function as a valve, accuracy and ease of production are enhanced. For example, the eccentric groove 42B can be formed easily by a lathe or the like with high precision. Also, because the width of the eccentric groove 42B can be set 1.1±0.05 mm, for example, reasonable errors can be allowed in its production. Dust or the like can be prevented from clogging the groove because the width of the eccentric groove 42B can be made large.

Figure 5A:
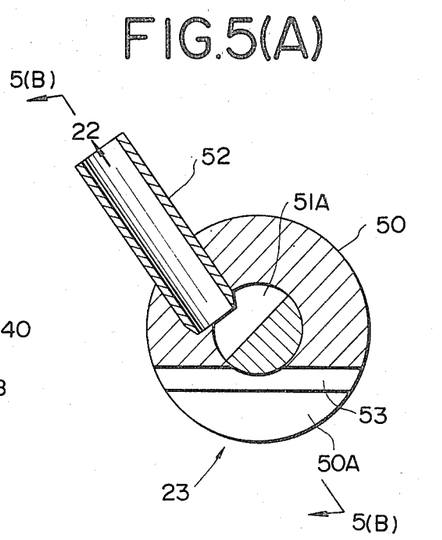

FIGS. 5A and 5B show a modification of the vacuum modulator 23 according to the present invention. A casing 50 has a through-hole in which a spindle 51 is rotatably placed. The right ends of the casing 50 and the spindle 51 are designed as in the embodiment shown in FIG. 4B. A semicircular-shaped notch portion 51A is formed in the spindle 51. Corresponding to the notch portion 51A, an upper portion of the casing 50 is formed with a through-hole in which a pipe 52 is fixed. The pipe 52 is inclined slightly from the radial direction. The pipe 52 leads to the line 22. The lower end of the pipe 52 partly protrudes into the space of the notch portion 51A. A slit 53 is formed along a chord of the casing 50 in the lower portion thereof. The upper edge of the slit 53 can communicate with the through-hole in the casing 50. The slit 53 also leads to the atmosphere through a notched portion 50A in the lower portion of the casing 50.

In operation, the slit 53 and the notch portion 51A of the spindle 51 function as a valve to control the vacuum by changing the rotation angle of the spindle 51. The lower end of the pipe 52 protrudes into the notch portion 51A of the spindle 51 to function as a stopper to prevent the spindle 51 from moving in its rotational and axial directions within a predetermined range.

Figure 6A:
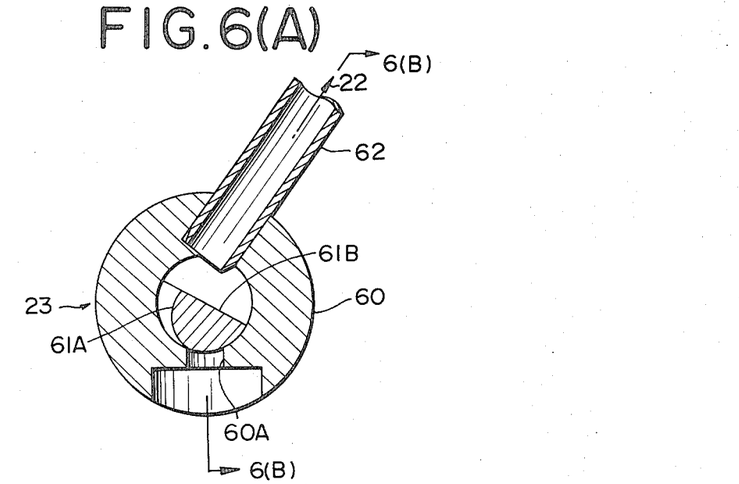
Figure 6B:
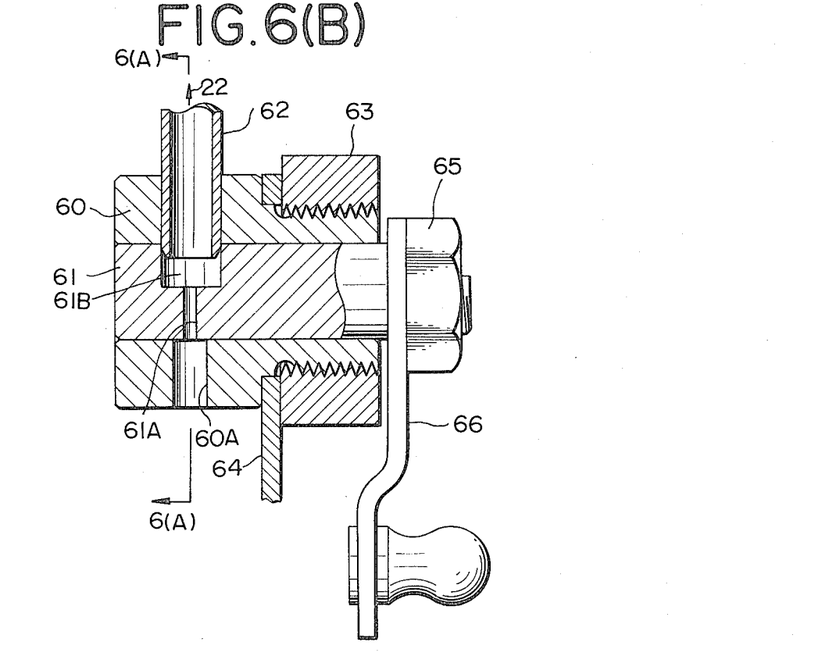

FIGS. 6A and 6B show a further modification of the vacuum modulator 23. A casing 60 has a through-hole in its axial direction in which a spindle 61 is rotatably placed. An eccentric groove 61A is formed in an intermediate portion of the spindle 61. A semicircular notch portion 61B is formed continuous to the eccentric groove 61A. The eccentric groove 61A is substantially positioned in the upper portion of the spindle 61 while the notch portion 61B is substantially positioned in the upper portion of the spindle 61. Corresponding to the notch portion 61B, a pipe 62 is fixed to a through-hole formed in the upper portion of the casing 60 which is inclined. The lower end of the pipe 62 slightly protrudes into the notched portion 61B of the spindle 61. A port 61A is formed in the lower portion of the casing 60.

The right end of the casing 60 is formed with a male screw portion to which a nut 63 is screwed whereby the casing 60 is fixedly secured to a bracket 64. The right end of the spindle 61 is formed with a male screw portion on which a nut 65 is screwed, whereby a lever 66 is fixed to the right end of the spindle 61. The construction and operation of the lever 66 and its related members are the same as in the embodiment shown in FIG. 4.

In operation, the eccentric groove 61A of the spindle 61 and the port 60A of the casing 60 function as a valve. The effective area between the spaces in the eccentric groove 61A and the port 60A is changed by changing the rotation angle of the spindle 61, to control the negative pressure from the line 22. Also, because the lower end of the pipe 22 partly protrudes into the notched portion 61A of the spindle 61, it functions as a stopper when the spindle 61 is to move in its rotational and axial directions.

The embodiment in FIGS. 6A and 6B may be said to be a combination of the embodiments shown in FIGS. 4 and 5.

Figure 7A:
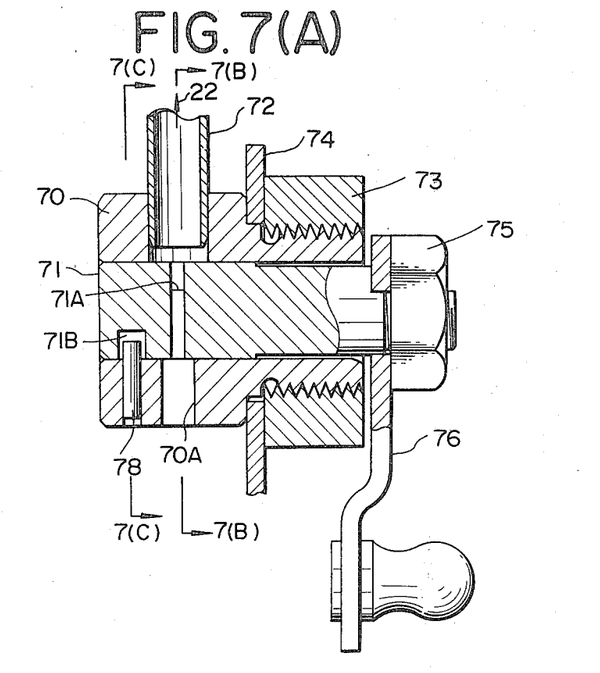
Figure 7B:
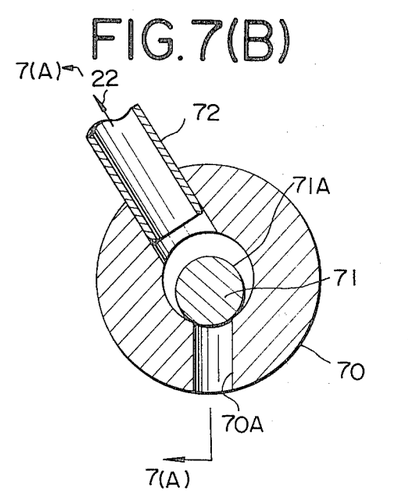
Figure 7C:
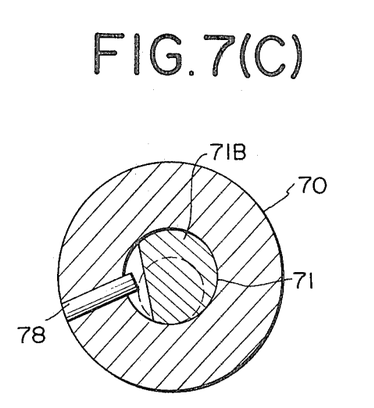

FIGS. 7A, 7B and 7C show still a further modification of the vacuum modulator. A casing 70 has a through-hole formed in its longitudinal direction in which a spindle 71 is rotatably placed. An eccentric groove 71A is formed in an intermediate portion of the spindle 71 as in the embodiment in FIG. 4. A pipe 72 is fixed in a through-hole formed in the upper portion of the casing 70 in its radial direction which is inclined. The lower end of the pipe 72 is connected to the eccentric groove 71A. A port 70A is formed in the lower portion of the casing 70 in its radial direction. A semicircular notched portion 71B is formed in the spindle 71 near its end. A pin 78 fixed to the casing 70 has a front end protruding into the notched portion 71B of the spindle 71. On the other hand, the casing 70 and the spindle 71 have the respective screw portions at the right ends thereof on which nuts 73, 75 are screwed, respectively whereby a bracket 74 and a lever 76 are fixedly secured thereto.

In operation, the eccentric groove 71B of the spindle 71 and the port 70A function as a valve as in the embodiment shown in FIG. 4. Also, the pin 78 functions as a stopper against the rotation and axial movement of the spindle 71.

Figure 8A:
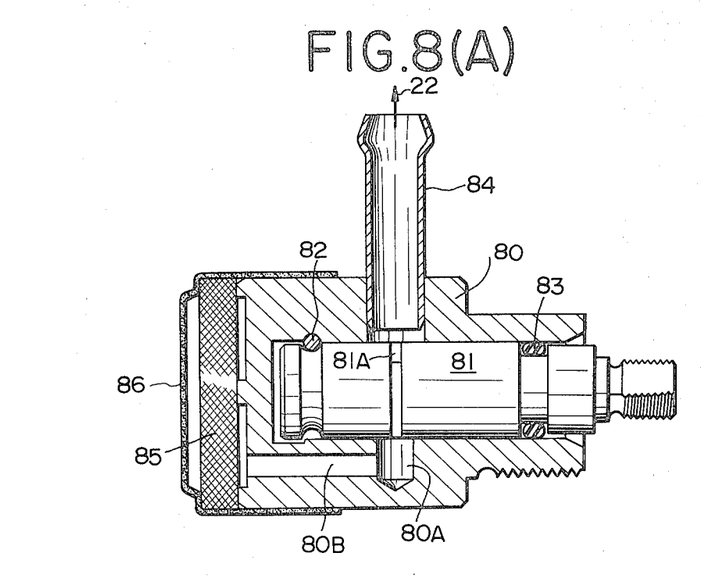
Figure 8B:
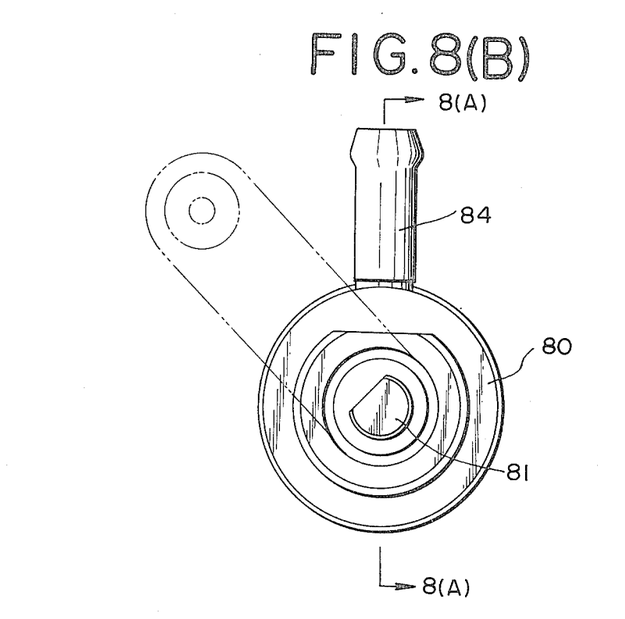

FIGS. 8A and 8B show another embodiment of the vacuum modulator. A hole is formed from the right end (FIG. 8A) of the casing 80 to a portion near the left end thereof in its axial direction in the casing 80. The hole is a blind hole formed substantially along the whole length of the casing 80. A spindle 81 is rotatably placed in the hole. A circular groove is formed in the left end portion of the spindle 81. A stopper pin 82 is provided to the casing 80 corresponding to the circular groove of the spindle 81. A sealing member 83 is provided near the right end portion of the spindle 83. An eccentric groove 81A is formed in an intermediate portion of the spindle 81. Formed in the upper portion of the casing 80 corresponding to the eccentric groove 81A is a through-hole formed in the radial direction of the casing 80 in which a tubing 84 is fixed. The tubing 84 leads to the line 22. A short hole 80A extends from the blind hole of the casing 80 toward the outer surface thereof in the lower portion of the casing 80. A hole 80B extends from the short hole 80A toward the left end of the casing 80 horizontally along the axis of the casing 80. A filter 85 is fixed to the left end of the casing 80 by a filter cover 86. The filter cover 86 has a number of openings through which the outer end of the hole 80B communicates with the atmosphere.

The operation of the embodiment in FIG. 8 is similar to that of FIG. 4. The eccentric groove 81A and the port 80A function as a valve. The line pressure is controlled by changing the rotation angle of the spindle 81.

According to the embodiment shown in FIG. 8, a port or hole 80A is connected via the hole 80B to the filter 85 which is attached to the left end of the casing 80. Thus, the size of the filter 85 can be large because it can be attached to the whole portion of the left end of the casing 80. For such a reason, the air flow resistance can be decreased remarkably. Also, it is easy to attach the filter 85 onto the left end of the casing 80.

Although not shown for the purpose of simplifying the figure, the right ends of the casing 80 and the spindle 81 are arranged as in the embodiment shown in FIG. 4 in which a bracket, nuts, etc. are properly provided.

Figure 9A:
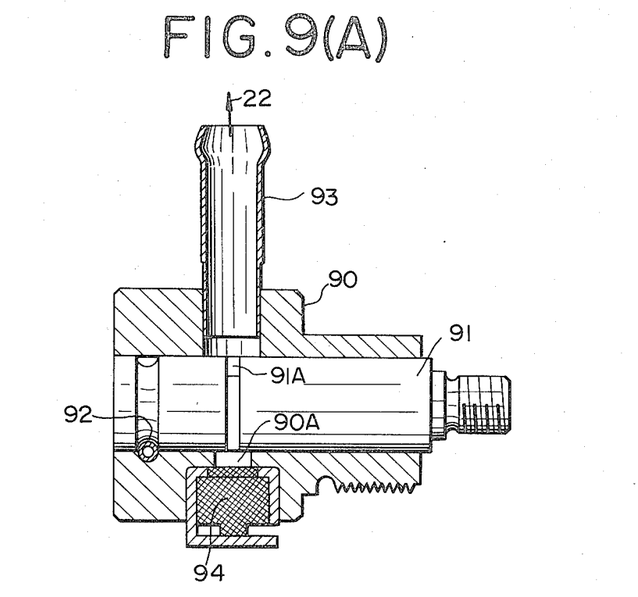
Figure 9B:
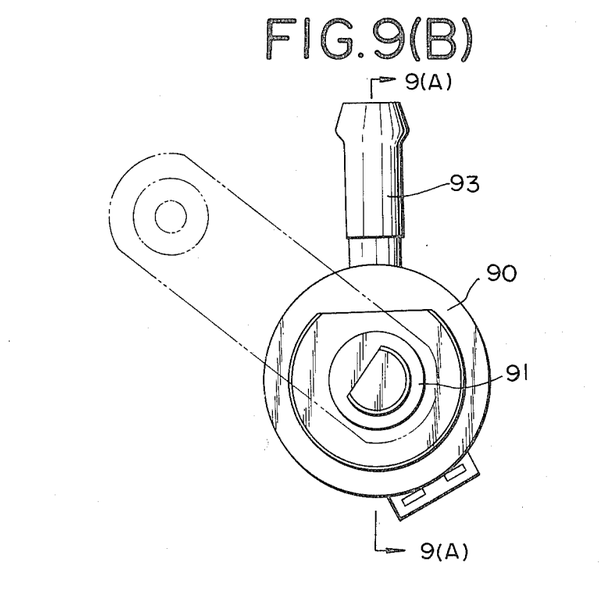

FIGS. 9A and 9B show still another embodiment of the present invention which is similar to the embodiment shown in FIG. 4. A casing 90 has a through-hole formed in its longitudinal direction in which a spindle 91 is rotatably placed. Formed near the left end of the spindle 91 is a circular groove in which a pin 92 is partly positioned to prevent the spindle 91 from axially moving. An eccentric groove 91A is formed in an intermediate portion of the spindle 91. Corresponding to the groove 91A, a through-hole is formed in an upper portion of the casing 90 in the radial direction. A tube 93 is fixed in the through-hole and leads to the line 22. A port 90A is formed in a lower portion of the casing 90 and communicates through a filter 94 with the atmosphere. Except for the operation of the filter 94, the operation of the embodiment shown in FIG. 9 is substantially the same as the embodiment shown in FIG. 4.

The construction of the right end portions of the casing and the spindle is the same as in the embodiment shown in FIG. 4, although not shown in FIG. 9.

Figure 10:
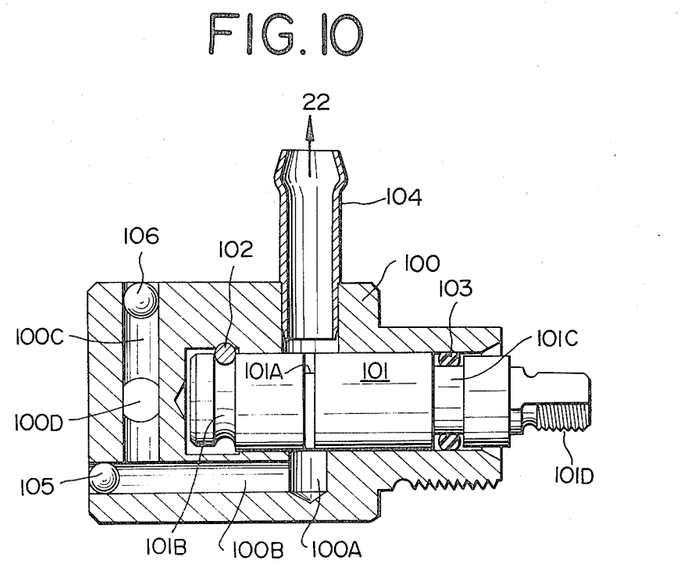

FIG. 10 shows another embodiment of the present invention. A casing 100 has a blind hole formed along the axis thereof in which a spindle 101 is rotatably placed. A circular groove 101B is formed near the left end of the spindle 101. A stopper pin 102 is fixed to the casing 100 in cooperation with the circular groove 101B to prevent the spindle 101 from moving in its axial direction. Also, a circular groove 101C is formed near the right end of the spindle 101. An O-ring 103 is set in the circular groove 101C. A screw portion 101D is formed at the right end of the spindle 101 whereby a lever (not shown) is fixed as in the embodiments shown and described. Formed in an intermediate portion of the spindle 101 is an eccentric groove 101A corresponding to which a through-hole is formed in an upper portion of the casing 100 in its radial direction. A pipe 104 is fixed in the through-hole, and leads via the line 22 to the vacuum source. A hole 100A is formed in a lower portion of the casing 100 to extend from the inner surface of the through-hole toward the outer surface of the casing 100. A hole 100B is placed between the hole 100A and the atmosphere along the axis of the casing 100. A ball 105 is provided in the left end of the hole 100B to close it. A hole 100C is formed near the left end of the casing 100 in its radial direction to connect a left end portion of the hole 100B with the atmosphere, but a ball 106 is provided in the upper end of the hole 100C to close it. A hole 100D is formed in the radial direction of the casing 100 to connect an intermediate portion of the hole 100C with the atmosphere via a filter or air cleaner (not shown).

In operation, the eccentric groove 101A and the hole or port 100A function as a valve as in the embodiment shown in FIG. 4, except for the operation of the air cleaner.

Figure 11A:
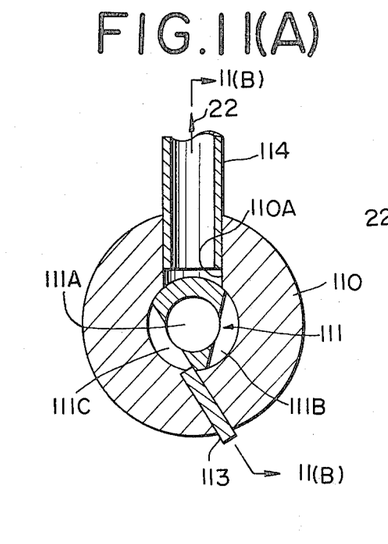
Figure 11B:
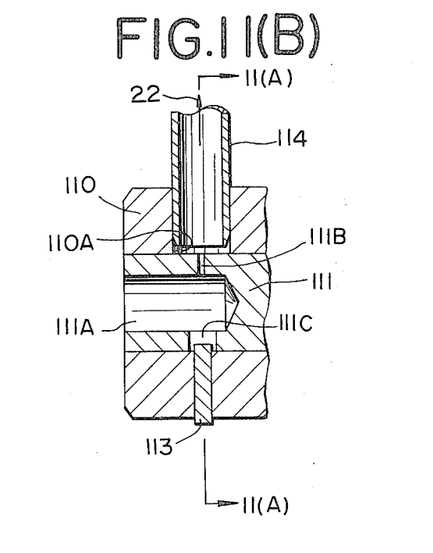

FIGS. 11A and 11B show another vacuum modulator according to the present invention. A casing 110 has a through-hole formed in its axial direction wherein a spindle 111 is rotatably placed as in the embodiment shown in FIG. 4, although the right portion thereof is not shown. A hole 111A is formed in the spindle 111 along its axis. The outer end of the hole 111A is open to atmosphere. The other or inner end of the hole 111A is connected to a slit 111B formed in an intermediate portion of the spindle in its radial direction. A notched portion 111C is formed in the spindle 111 at an angle to the slit 111B. The relation between the slit 111B and the notched portion 111C is best shown in FIG. 11A. One end of a pin 113 fixed to the casing 110 protrudes into the notched portion 111C to prevent the spindle 111 from rotating within a predetermined range and axially moving.

In FIGS. 11A and 11B, a through-hole 110A is formed in an upper portion of the casing 110 in its radial direction, corresponding to the slit 111B. A pipe 114 is fixed in the through-hole 110A. This through-hole 110A and the slit 111B of the spindle 111 function as a valve. As the slit 111B communicates with the hole 111A of the spindle 111, the precision of the valve opening is dependent on the width of the slit 111B, while the depth of the slit 111B can be disregarded. Thus, accurate control is available. As the pin 113 and the pipe 114 can be arranged in a common plane, the casing 110 and the spindle 111 can be short.

Figure 12A:
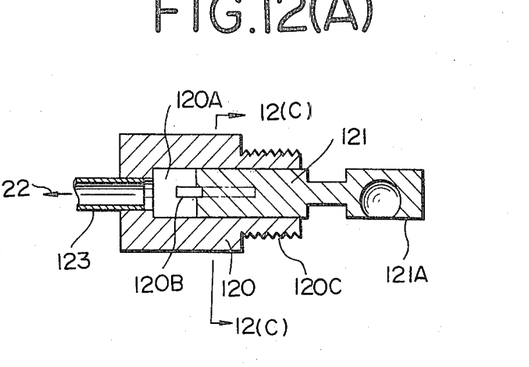
Figure 12B:
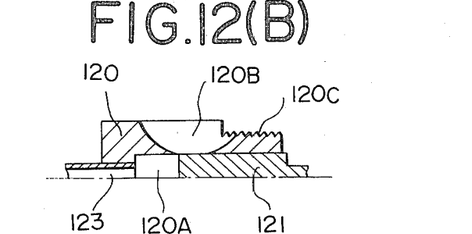
Figure 12C:
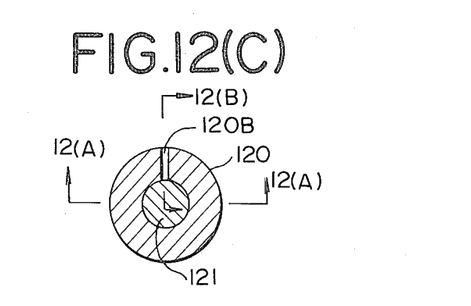

FIGS. 12A, 12B and 12C show another embodiment of the vacuum modulator. A casing 120 has a long hole 120A formed in its longitudinal direction wherein a spindle 121 is movably placed in its axial direction. The casing 120 has a male screw portion 120C at the right end thereof. The casing 120 is fixed to a bracket (not shown) by screwing a nut to the screw portion 120C thereof. The spindle 121 has a securing portion 121A at its right end which is connected to a link mechanism (not shown) so that the spindle 121 is movable within a predetermined range, for example, 74 mm or less in its axial direction.

As best shown in FIG. 12B, a slit 120B is formed in a side portion of the casing 120. The lower portion of the slit 120B can communicate with the hole 120A of the casing 120 by changing the position of the spindle 121 to close the opening of the slit 120B leading to the hole 120A. The front end of the spindle 121 and the slit 120B function as a valve.

A pipe 123 is fixed in a through hole formed in the left end of the casing 120. The hole 120A is connected via the pipe 123 to the line 22.

Figure 13A:
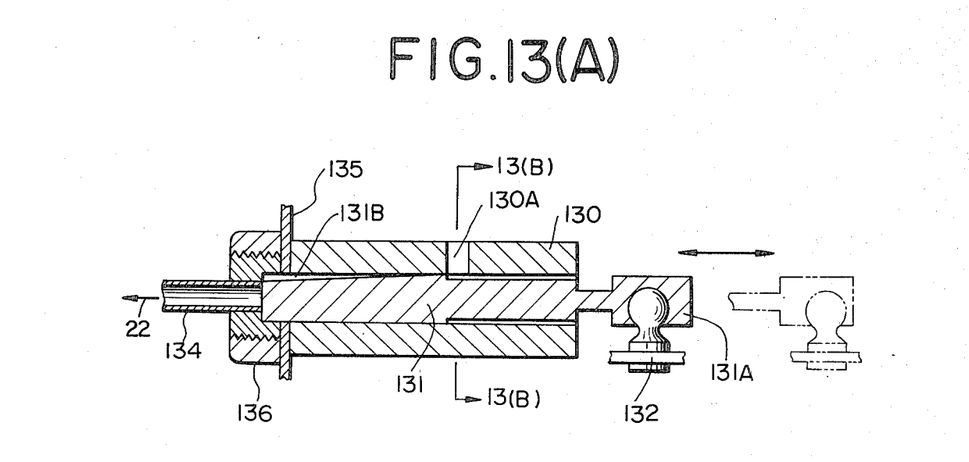
Figure 13B:
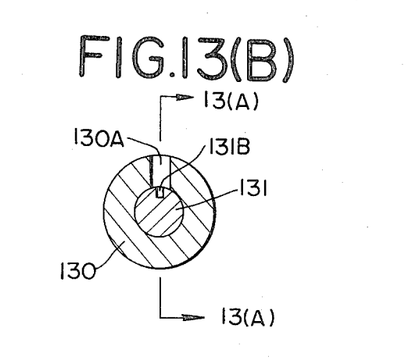

FIGS. 13A and 13B show another vacuum modulator according to the present invention. The length of a casing 130 is relatively long and has therein a hole formed along its axis in which a spindle 131 is movably placed in its axial direction. The spindle 131 has at its right end an operating portion 131A to which a part 132 of a link mechanism is connected. By means of the link mechanism, the spindle 131 can reciprocally move in its axial direction within a predetermined range, for example, between the solid line and the broken line (corresponding to about 40 mm). A through-hole 130A is formed in an intermediate portion of the casing 130 in its radial direction. Corresponding to the through-hole 130A, a tapered slit 131B is formed in a a left and upper portion of the spindle 131. The casing 130 has a screw portion at the left end thereof on which a nut 136 is screwed whereby the casing 130 is fixed to a bracket 135. A pipe 134 is fixed to the left end of the casing 130. The inner space of the casing 130 communicates with the line 22 via the pipe 134.

In operation, the taper slit 131B and the through-hole 130A function as a valve. Therefore, if the taper of the slit 131B is small, the valve opening can be precisely maintained.

According to the present invention, the arrangement of the lines and the vacuum modulator can be simplified. Merely by changing the size of the orifice near the branch portion of the line, the characteristics of the vacuum modulator can be changed without any change of the vacuum modulator itself. At the same time, the control characteristics of the throttle modulator can be changed to obtain the best gear-change actions or operations for motor vehicles. To change them is also easy.

In the embodiments shown in FIGS. 4 and 6 to 10, the vacuum modulator has a spindle formed with an eccentric groove so that the production thereof is easy and accurate as compared with the prior art arrangement. The width of the groove can be set wide, for example, about five times as the prior art. Also, relatively big errors can be allowed. Dust and the like can be prevented from clogging.

In the embodiment shown in FIG. 11, the spindle is cylindrical so that precise control can be obtained by forming a precise groove in the spindle.

In the embodiment shown in FIG. 13, the stroke of the spindle can be set long so that the precision of the control can be remarkably improved. Accurate control can be obtained only by forming in the spindle a slit having its bottom which is tapered and wide, in an easy way or manner.

What is claimed is:
1. A vacuum modulator arrangement, comprising:
a vehicular automatic transmission;
a fuel-injection pump;
a vacuum source;
a brake booster;
a vacuum modulator;
a throttle modulator for controlling said automatic transmission;
connecting means for operatively interconnecting said vacuum source, said brake booster, said vacuum modulator and said throttle modulator, said connecting means including a branch portion with a common passage; an orifice removably positioned in said common passage, said orifice having a predetermined effective area;
first and second conduits respectively connecting said vacuum source and said brake booster to said common passage on one side of said orifice;

third and fourth conduits respectively connecting said vacuum modulator and said throttle modulator to said common passage on the opposite side of said orifice whereby said vacuum modulator operates to control the communication between said vacuum source and the atmosphere so that the pressure applied to said throttle modulator can be changed in response to the controlling conditions of said vacuum modulator.

2. The vacuum modulator arrangement of claim 1, wherein said vacuum modulator is positioned at one side of an engine, and said vacuum source is positioned at the other side of said engine.

3. The vacuum modulator arrangement of claim 1, wherein said vacuum modulator includes:
   a casing having an internal cylindrical chamber;
   a through-hole in one portion of said casing, said through-hole being in communication with said chamber and being connected via said third conduit to said vacuum source;
   a port in another portion of said casing communicating with said chamber and the atmosphere; and
   a spindle rotatably arranged in said chamber, said spindle having a cylindrical surface arranged to prevent communication between said through-hole and said port, said cylindrical surface being interrupted by an eccentric groove which is arranged to be aligned with said through-hole and said port by rotation of said spindle to thereby function as a valve connection between said through-hole and said port.

4. The vacuum modulator arrangement of claim 1, wherein the vacuum modulator comprises:
   a casing having an internal cylindrical chamber;
   a through-hole in one portion of the casing, said through hole being in communication with said chamber and being connected via said third conduit to said vacuum source;
   a slit formed in another portion of said casing, said slit being in communication with said chamber and the atmosphere; and
   a spindle rotatably arranged in said chamber, said spindle having a cylindrical surface arranged to prevent communication between said through-hole and said slit, said cylindrical surface being interrupted by a semicircular notched portion formed in an intermediate portion of said spindle, said notched portion being arranged to be aligned with said through-hole and said slit by rotation of said spindle to thereby function as a valve connection between said through-hole and said slit.

5. The vacuum modulator arrangement of claim 1, wherein the vacuum modulator includes:
   a casing having an internal cylindrical chamber;
   a through-hole formed in the casing, said through-hole being in communication with said vacuum source via said third conduit;
   a spindle rotatably arranged in said chamber, said spindle having a slit formed in an intermediate portion of said spindle in a plane containing said through-hole, a hole in said spindle connecting said slit to the atmosphere, said spindle having a cylindrical surface arranged to interrupt any communication between said through-hole and said slit, said slit being arranged to be aligned with said through-hole by rotation of said spindle to thereby function as a valve connection between said through-hole and the atmosphere via said hole in said spindle.

6. The vacuum modulator arrangement of claim 1, wherein the vacuum modulator includes:
   a casing having an internal chamber, a first portion of said chamber being connected to said vacuum source via said third conduit, a second portion of said chamber being in communication with the atmosphere;
   a valve element movably placed in said chamber, said valve element having a surface arranged to prevent communication between said vacuum source and the atmosphere, said surface being interrupted by a slit formed in said valve element which slit is arranged to be placed in communication with the first and second portions of said chamber to thereby function as a valve connection between said vacuum source and the atmosphere.

7. The vacuum modulator arrangement of claim 1, wherein the vacuum modulator includes:
   a casing having an internal chamber, a first portion of said chamber being connected to said vacuum source via said third conduit, a second portion of said chamber being in communication with the atmosphere;
   a valve element movably placed in said chamber, said valve element having a surface arranged to prevent communication between said vacuum source and the atmosphere, the internal surface of said chamber being interrupted by a slit formed therein, said slit being arranged to allow communication between said vacuum source and the atmosphere by movement of the valve element to thereby function as a valve connection between said vacuum source and the atmosphere.

* * * * *